(12) United States Patent
Suh (10) Patent No.: US 11,556,760 B2
(45) Date of Patent: Jan. 17, 2023

(54) LEARNING-BASED DATA PROCESSING SYSTEM AND MODEL UPDATE METHOD

(71) Applicant: ELLEXI CO., LTD., Seoul (KR)

(72) Inventor: Jang Won Suh, Seoul (KR)

(*) Notice: Subject to any disclaimer, the term of this patent is extended or adjusted under 35 U.S.C. 154(b) by 565 days.

(21) Appl. No.: 16/677,694

(22) Filed: Nov. 8, 2019

(65) Prior Publication Data

US 2020/0311516 A1    Oct. 1, 2020

(30) Foreign Application Priority Data

Apr. 1, 2019 (KR) .......................... 10-2019-0037865

(51) Int. Cl.
| | | |
|---|---|---|
| G06N 3/02 | (2006.01) | |
| G06N 3/04 | (2006.01) | |
| G06N 20/00 | (2019.01) | |
| G06K 9/62 | (2022.01) | |
| G06N 5/04 | (2006.01) | |

(52) U.S. Cl.
CPC ......... *G06N 3/0454* (2013.01); *G06K 9/6257* (2013.01); *G06K 9/6267* (2013.01); *G06N 5/04* (2013.01); *G06N 20/00* (2019.01)

(58) Field of Classification Search
CPC .... G06F 16/958; G06F 21/554; G06F 21/552; G06K 9/6257; G06K 9/6267; G06K 9/627; G06K 9/6271; G06K 9/6288; G06K 9/6262; G06K 9/6292; G06N 3/02; G06N 3/0454; G06N 3/08; G06N 3/084; G06N 5/04; G06N 20/00; G06N 20/20; G06Q 10/063112; G06Q 30/0277; G06V 20/41; G06V 20/56; G06V 10/82; G10L 15/01; A61B 3/14; G07C 5/085

USPC ............... 382/157; 704/232; 706/15, 54
See application file for complete search history.

(56) References Cited

U.S. PATENT DOCUMENTS

| | | | | |
|---|---|---|---|---|
| 10,475,442 | B2* | 11/2019 | Lee | G10L 15/01 |
| 11,010,237 | B2* | 5/2021 | Balasubramanian | G06N 20/20 |
| 11,410,056 | B1* | 8/2022 | Xu | G07C 5/085 |
| 11,429,823 | B1* | 8/2022 | Lan | G06N 20/00 |
| 2010/0145902 | A1* | 6/2010 | Boyan | G06F 16/958 |
| | | | | 715/810 |
| 2015/0019214 | A1* | 1/2015 | Wang | G06N 3/02 |
| | | | | 704/232 |
| 2016/0125572 | A1* | 5/2016 | Yoo | G06N 3/084 |
| | | | | 382/157 |
| 2017/0357879 | A1* | 12/2017 | Odaibo | A61B 3/14 |
| 2018/0218407 | A1* | 8/2018 | He | G06Q 30/0277 |
| 2018/0373985 | A1* | 12/2018 | Yang | G06V 10/82 |
| 2019/0043193 | A1* | 2/2019 | Odaibo | G06N 3/0454 |

(Continued)

FOREIGN PATENT DOCUMENTS

| | | |
|---|---|---|
| KR | 10-2014-0112839 A | 9/2014 |
| KR | 10-2017-0061016 A | 6/2017 |
| KR | 10-2018-0076753 A | 7/2018 |

*Primary Examiner* — Gerald Gauthier (57) ABSTRACT

Provided is a learning-based data processing system which generates a learning model by learning a learning data set, recognizes observational data according to the learning model, and provides a recognition result. The learning-based data processing system may include a data recognition device configured to generate a cascaded learning model by cascading a first learning model generated based on a first learning data set and a second learning model generated based on a second learning data set.

18 Claims, 5 Drawing Sheets

(56) References Cited

U.S. PATENT DOCUMENTS

| | | | |
|---|---|---|---|
| 2019/0362072 A1* | 11/2019 | Kesarwani | G06F 21/552 |
| 2019/0370694 A1* | 12/2019 | Diamanti | G06N 20/00 |
| 2020/0104673 A1* | 4/2020 | Michiels | G06N 20/00 |
| 2020/0151610 A1* | 5/2020 | Chueh | G06K 9/6292 |
| 2020/0160252 A1* | 5/2020 | Sahni | G06Q 10/063112 |
| 2020/0285737 A1* | 9/2020 | Kraus | G06F 21/552 |
| 2020/0311516 A1* | 10/2020 | Suh | G06N 20/00 |
| 2020/0311615 A1* | 10/2020 | Jammalamadaka | G06N 20/20 |
| 2020/0334524 A1* | 10/2020 | Sprague | G06N 3/08 |
| 2020/0342267 A1* | 10/2020 | Usuda | G06K 9/6262 |

\* cited by examiner

LEARNING-BASED DATA PROCESSING SYSTEM AND MODEL UPDATE METHOD

CROSS-REFERENCES TO RELATED APPLICATION

The present application claims priority under 35 U.S.C. § 119(a) to Korean application number 10-2019-0037865, filed on Apr. 1, 2019, in the Korean Intellectual Property Office, which is incorporated herein by reference in its entirety.

BACKGROUND

1. Technical Field

Various embodiments generally relate to a data processing technology, and more particularly, to a learning-based data processing system and a model update method.

2. Related Art

Machine learning is one of access methods for implementing an artificial intelligence system.

The artificial intelligence system analyzes and utilizes an enormous amount of data collected in various environments, and the application scope of the artificial intelligence system is expanded day by day into vehicles, image processing, voice processing, medical treatment, security, finance and the like.

When a problem to be solved is defined, the artificial intelligence system constructs a data set by collecting and processing data for solving the problem. The data set may be learned (modeled) according to a method suitable for solving the problem, for example, a neural network method, in order to derive a learning parameter (model). Furthermore, the artificial intelligence system recognizes input data through a process of inferring a result by applying the learning model to fed data.

When the number of data fed in the inference component process reaches a meaningful level, the learning model may be updated.

In order to construct the learning model by analyzing an enormous amount of data, a large-capacity storage device is required to continuously store data which are accumulated while the amount of computation in the system is increased.

SUMMARY

In an embodiment, there is a learning-based data processing system which generates a learning model by learning a learning data set, recognizes observational data according to the learning model, and provides a recognition result. The learning-based data processing system may include a data recognition device configured to generate a cascaded learning model by cascading a first learning model generated based on a first learning data set and a second learning model generated based on a second learning data set.

In an embodiment, there is provided a model update method of a learning-based data processing system which generates a learning model by learning a learning data set, recognizes observational data according to the learning model, and provides a recognition result. The model update method may include the steps of: generating a first learning model based on a first learning data set; generating a second learning model based on a second learning data set; and generating a cascaded learning model by cascading the first learning model and the second learning model.

DETAILED DESCRIPTION

Hereinafter, a learning-based data processing system and a model update method according to the present disclosure will be described below with reference to the accompanying drawings through exemplary embodiments.

Figure 1:
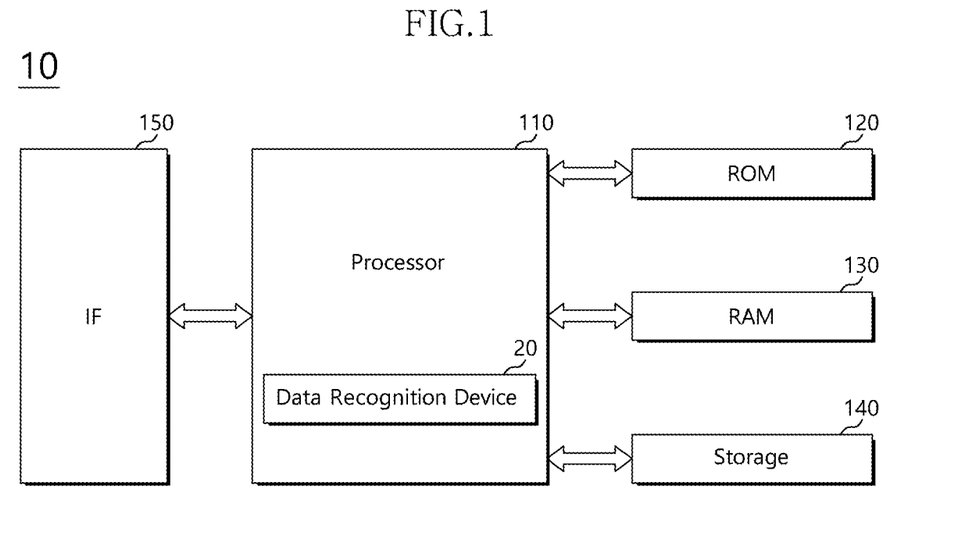
FIG. 1 is a configuration diagram illustrating a learning-based data processing system in accordance with an embodiment.

FIG. 1 is a configuration diagram illustrating a learning-based data processing system in accordance with an embodiment.

Referring to FIG. 1, the learning-based data processing system 10 in accordance with the present embodiment may include a processor 110, a ROM 120, a RAM 130, a storage 140 and an interface (IF) 150.

The processor 110 may decode and compute a program code required for the learning-based data processing system 10 to operate, and control overall operations of the learning-based data processing system 10.

The ROM 120 may store various system data, firmware codes and software codes required for operations of the learning-based data processing system 10.

The RAM 130 may store data accompanied by an operation of the processor 110.

The storage 140 may be a semiconductor memory device for collecting data to be used by the learning-based data processing system 10.

The IF 150 may include a communication network IF through which the learning-based data processing system 10 can transmit/receive data via a communication network and a user IF through which an administrator or operator can access the learning-based data processing system 10.

In an embodiment, the processor 110 may include a data recognition device 20.

The data recognition device 20 may generate a learning model by modeling an input data set, i.e. a learning data set. Furthermore, the data recognition device 20 may recognize observational feeding data by applying the learning model to the observational data, and output the recognized data.

When the number of observational data fed during an inference component process is equal to or more than a preset reference value, the data recognition device 20 may construct an update learning data set which is a new learning data set, and update the learning model.

In an embodiment, the data recognition device 20 may generate a cascaded learning model by cascading a learning model (first learning model) generated based on a previous learning data set to a learning model (second learning model) generated based on the update learning data set.

That is, when learning data are added to update the learning model, the data recognition device 20 may not accumulate and learn the learning data, but update the learning model using a learning model for each learning data set.

In an embodiment, the data recognition device 20 may use a neural network method to generate a learning model. However, the present embodiment is not limited thereto.

The learning method for generating the first learning model and the learning method for generating the second learning model may be configured in the same manner or different manners.

In accordance with the present embodiment, the learning-based data processing system may not accumulate and store updated learning data, but store only a learning model, thereby minimizing the amount of stored data and the computing amount.

The data recognition device 20 may be implemented as a software module, a hardware module or a combination of software and hardware.

Figure 2:
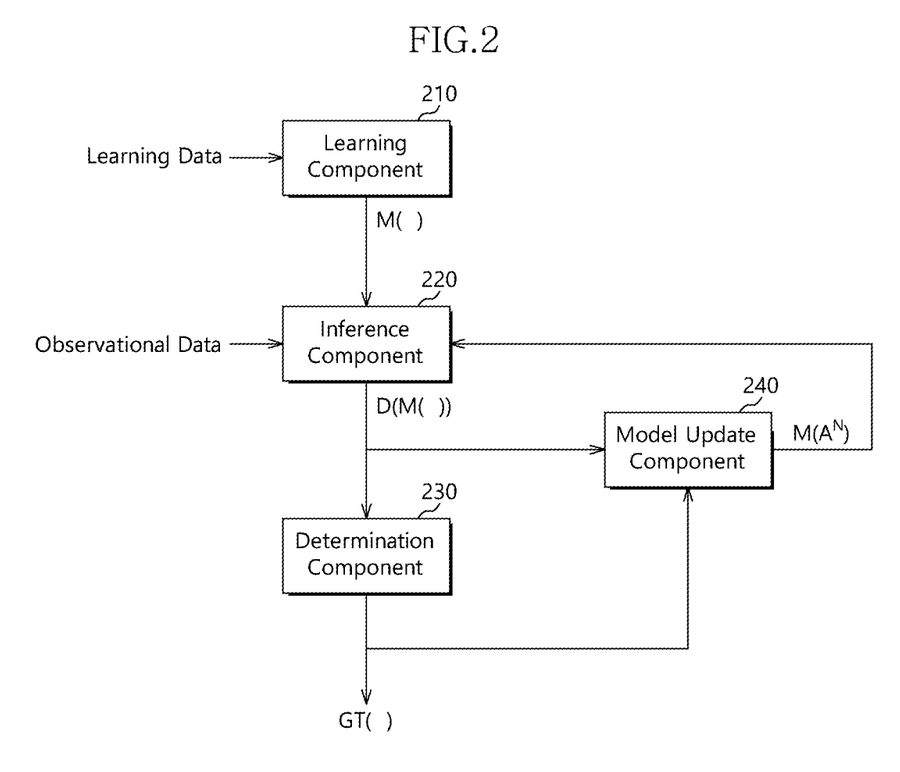
FIG. 2 is a configuration diagram illustrating a data recognition device in accordance with an embodiment.

FIG. 2 is a configuration diagram illustrating the data recognition device in accordance with the present embodiment.

Referring to FIG. 2, the data recognition device 20 in accordance with the present embodiment may include a learning component 210, an inference component 220, a determination component 230 and a model update component 240.

The learning component 210 may be configured to generate a learning model M(.) by learning elements included in an input learning data set.

In an embodiment, the learning component 210 may generate the learning model M(.) by learning data based on an artificial neural network method.

The artificial neural network method indicates a method that models data by repeating a process of estimating a result by applying a weight to input data and detecting an error of the estimated value to correct the weight.

The inference component 220 may apply learning model M(.) to observational data, and output a recognition result D(M(.)) of the observational data.

The determination component 230 may perform analysis and determination based on the input data and the recognition result D(M(.)) of the inference component 220, and output a determination result value (Ground Truth) GT(.).

The model update component 240 may generate a cascaded learning model $M(A^N)$ by cascading the recognition results of the first learning model generated from the previous learning data set and the second learning model generated from the current update learning data set, and provide the cascaded learning model $M(A^N)$ to the inference component 220.

Here, N may indicate the number of times that the learning model is updated.

In an embodiment, when the number of observational data is equal to or more than a preset reference value, the model update component 240 may construct an update learning data set. When the update learning data set is constructed, the model update component 240 may generate the second learning model, and update the learning model by cascading the recognition results of the first learning model generated at the previous point of time and the second learning model.

Figure 3:
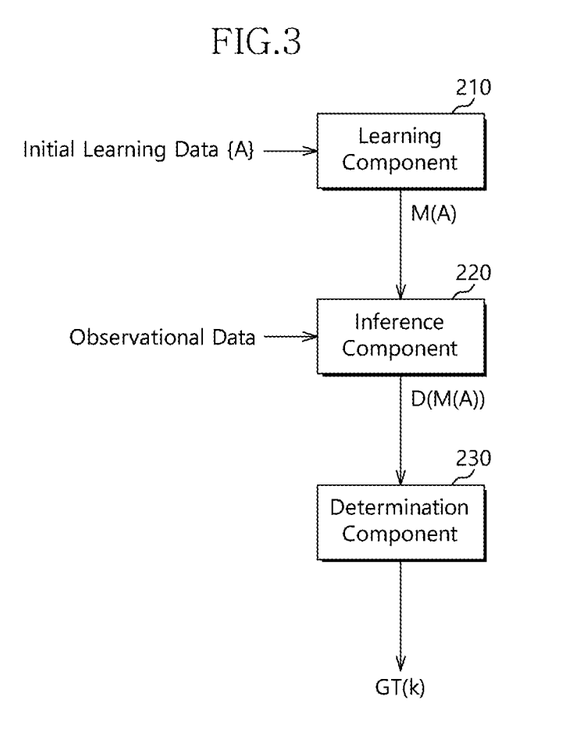
FIG. 3 is a conceptual view for describing an initial model generation method in accordance with an embodiment.

FIG. 3 is a conceptual view for describing an initial model generation method in accordance with an embodiment.

Referring to FIG. 3, as an initial learning data set A is constructed, the learning component 210 may generate a first learning model M(A) by modeling elements k of the initial learning data set A.

Then, as observational data are fed, the inference component 220 may output a recognition result D(M(A)) based on the first learning model M(A).

The determination component 230 may evaluate the recognition result D(M(A)) of the inference component 220, and generate a determination result value GT(k).

Until the number of collected observational data approaches a preset number, the data recognition device 20 recognizes the observational data according to the first learning model M(A) generated based on the initial learning data set.

Figure 4:
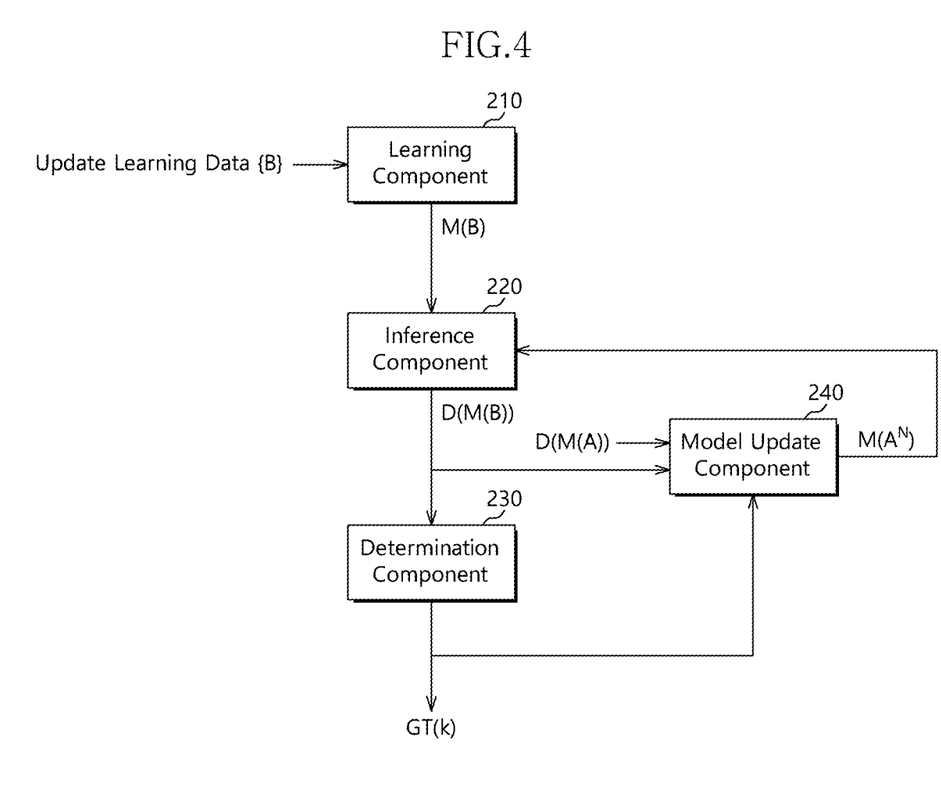
FIG. 4 is a conceptual view for describing a model update method in accordance with an embodiment.

FIG. 4 is a conceptual view for describing a model update method in accordance with an embodiment.

When the number of collected observational data is equal to or more than a preset reference value, an update learning data set B may be constructed.

The learning component 210 may generate a second learning model M(B) by modeling elements k of the update learning data set B.

The inference component 220 may apply the second learning model M(B) to the elements k of the update learning data set B, and output a recognition result D(M(B)).

The determination component 230 may evaluate the recognition result D(M(B)) of the inference component 220, and output a determination result value GT(k) where k represents an element of the update learning data set B.

The model update component 240 may generate a cascaded learning model $M(A^N)$ based on the recognition result D(M(A)) based on the first learning model M(A), the recognition result D(M(B)) based on the second learning model M(B), and the determination result value GT(k) of the determination component 230.

Now, the inference component 220 may recognize data according to the cascaded learning model $M(A^N)$ until the number of collected observational data becomes equal to or more than the preset reference value.

In an embodiment, the model update component 240 may derive a classification function f which has a relation of f{(D(M(A),k)), (D(M(B),k))}==GT(k) for all the elements k of the update learning data set B. That is, the model update component 240 may derive the classification function f that equalizes the recognition result D(M(A),k) by the first learning model and the recognition result D(M(B),k) by the second learning model to the determination result value GT(k) for all the elements k of the update learning data set.

The classification function may be a function in which the recognition result D(M(.)) is mapped to an element c of a finite set. Here, C represents a set of elements c, and CN(C) represents the size of the set C.

The cascaded learning model may be defined as $(M(A^N))$=f{(D(M(A),k)), (D(M(B),k))}.

Figure 5:
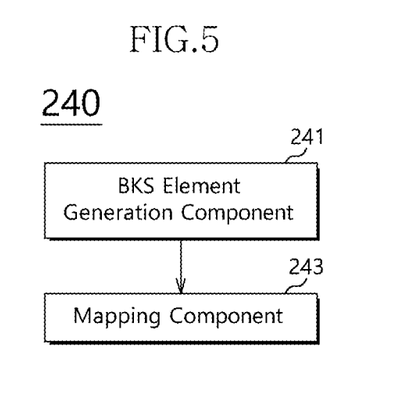
FIG. 5 is a configuration diagram illustrating a model update component in accordance with an embodiment.

FIG. 5 is a configuration diagram illustrating the model update component in accordance with the present embodiment.

Referring to FIG. 5, the model update component 240 may include a BKS (Behavior Knowledge Space) element generation component 241 and a mapping component 243.

In an embodiment, the model update component 240 may use a BKS method to derive the cascaded learning model $M(A^N)$.

The BKS method indicates a method that stores determination result values for recognition results of the inference component 220 in a table, and provides a recognition result by referring to the table, when new (observational) data are introduced.

In the BKS method, the recognition results of the inference component 220 may become key data, and the BKS element generation component 241 may construct BKS elements by calculating a statistics vector for each key data.

BKS: Set of BKS elements

BKS element: {(key data, statistics vector)}

In an embodiment, the BKS element generation component 241 may construct the BKS elements based on recognition results obtained by inferring all data k of the previous learning data set A and the update learning data set B.

In an embodiment, the BKS element generation component 241 may set ordered pairs of the recognition result D(M(A)) based on the first learning model M(A) and the recognition result D(M(B)) based on the second learning model M(B) to key data.

Key data=[D(M(A)), D(M(B))]

The BKS element generation component 241 may set [the number of times that the corresponding key data appears in the update learning data set B, the number of times that GT(B) is equal to c (GT(B)=c) when the corresponding key data appear for all the elements c of the classification function] in the learning data set to the statistics vector. Therefore, the dimension of the statistics vector may have a magnitude of [CN(C)+1].

As the key data are set to the ordered pairs of [D(M(A)), D(M(B))], the BKS element generation component 241 may construct the statistics vectors for the respective ordered pairs of [D(M(A)), D(M(B))] constituting the key data.

The mapping component 243 may map an element c to the corresponding key data, the element c having the maximum value among the elements of the statistics vector from the second element to the last element, among the BKS elements whose key data are D(M(A),k), D(M(B),k), the last element indicating the number of times that GT(B) is equal to c (GT(B)=c) when the corresponding key data appear for all the elements c of the classification function f.

As such, the model update component 240 may generate the classification function by cascading the recognition result of the first learning model and the recognition result of the second learning model through the BKS method, such that the classification function can be applied to the subsequent inference component process.

Figure 6:
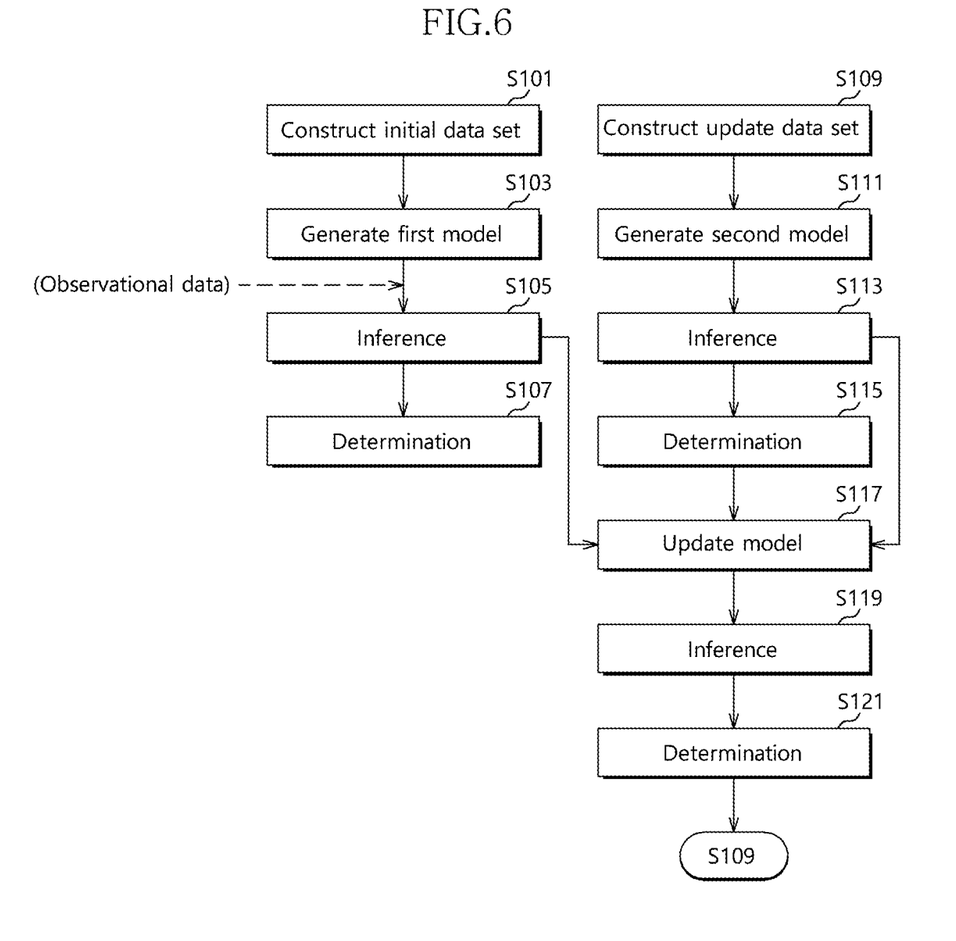
FIG. 6 is a flowchart for describing a model update method in accordance with an embodiment.

FIG. 6 is a flowchart for describing a model update method in accordance with an embodiment.

As an initial learning data set A is constructed in step S101, the learning component 210 of the data recognition device 20 may generate a first learning model M(A) by modeling elements k of the initial learning data set A in step S103.

Then, as observational data are fed, the inference component 220 of the data recognition device 20 may output a recognition result D(M(A)) based on the first learning model M(A) in step S105.

The recognition result D(M(A)) of step S105 may be evaluated by the determination component 230 to compare the recognition result D(M(A)) to actual data, and the determination result for the observational data may be provided as a determination result value GT(k) in step S107.

Until the number of collected observational data approaches a preset number, the data recognition device 20 recognizes the observational data according to the first learning model M(A) generated based on the initial learning data set.

When the number of collected observational data becomes equal to or more than the preset reference value, an update learning data set B may be constructed in step S109.

The learning component 210 of the data recognition device may generate a second learning model M(B) by modeling elements k of the update learning data set B in step S111. The inference component 220 may apply the second learning model M(B) to the elements k of the update learning data set B, and output a recognition result D(M(B)).

Then, the determination component 230 of the data recognition device 20 may output a determination result, obtained by evaluating the recognition result D(M(B)) for the update learning data set B, as the determination result value GT(k) in step S115.

The model update component 240 of the data recognition device 20 may generate a cascaded learning model $M(A^N)$ based on the recognition result D(M(A)) based on the first learning model M(A), the recognition result D(M(B)) based on the second learning model M(B), and the determination result value GT(k) of step S115, in step S117.

Now, the inference component 220 may recognize data according to the cascaded learning model $M(A^N)$ until the number of collected observational data becomes equal to or more than the preset reference value, in step S119, and the recognition result may be evaluated by the determination component 230 in step S121.

When the number of collected observational data is equal to or more than the preset reference value, the process may return to step S109 to repeat the process of updating the learning model.

In an embodiment, step S117 of updating the learning model may include deriving a classification function f which has a relation of f{(D(M(A),k)), (D(M(B),k))}=GT(k) for all the elements k of the update learning data set B.

In an embodiment, the BKS method may be used to derive the classification function f. However, the present embodiment is not limited thereto.

In an embodiment, ordered pairs of the recognition result D(M(A)) based on the first learning model M(A) and the recognition result D(M(B)) based on the second learning model M(B) may be set to key data.

The model update component 240 may set [the number of times that the corresponding key data appears in the update learning data set B, the number of times that GT(B) is equal to c (GT(B)=c) when the corresponding key data appear for all the elements c of the classification function] in the learning data set to the statistics vector.

When the BKS elements are constructed, the model update component 240 may derive the classification function by mapping an element c to the corresponding key data, the element c having the maximum value among the elements of the statistics vector from the second element to the last element, among the BKS elements whose key data are D(M(A),k), D(M(B),k), the last element indicating the number of times that GT(B) is equal to c (GT(B)=c) when the corresponding key data appear for all the elements c of the classification function f.

Therefore, the observational data do not need to be accumulated and stored, but the learning model of the previous learning step may be used to update the model, which makes it possible to minimize the amount of data stored in the learning-based data processing system 10 and the computation amount of the learning-based data processing system 10.

In an embodiment, the data recognition device 20 may be implemented as one or more hardware chips, and mounted on the learning-based data processing system 10. For example, the data recognition device 20 may be implemented as a hardware chip dedicated to artificial intelligence, or implemented as a part of a general-purpose processor (CPU or application processor) or a graphic processor (GPU), and mounted on the learning-based data processing system 10.

In accordance with the present embodiment, all data provided for analysis do not need to be stored. Furthermore, since newly fed data are learned based on the cascaded learning model, it is possible to minimize the amount of stored data and the computation amount.

While various embodiments have been described above, it will be understood to those skilled in the art that the embodiments described are examples only. Accordingly, the learning-based data processing system and the model update method, which have been described herein, should not be limited based on the described embodiments.

What is claimed is:

1. A learning-based data processing system which generates a learning model by learning a learning data set, recognizes observational data according to the learning model, and provides a recognition result, the learning-based data processing system comprising a data recognition device configured to generate a cascaded learning model by cascading a first learning model generated based on a first learning data set and a second learning model generated based on a second learning data set,
wherein the data recognition device comprises:
a learning component configured to generate a learning model by learning elements included in the learning data set;
an inference component configured to apply the learning model to the observational data and output a recognition result;
a determination component configured to evaluate the recognition result of the inference component, and output a determination result value; and
a model update component configured to generate the cascaded learning model based on a first recognition result of the inference component by the first learning model and a second recognition result of the inference component by the second learning model, and provide the cascaded learning model to the inference component.

2. The learning-based data processing system according to claim 1, wherein the data recognition device learns the learning data set based on an artificial neural network.

3. The learning-based data processing system according to claim 1, wherein the model update component constructs the second learning data set when the number of observational data is equal to or more than a preset reference value.

4. The learning-based data processing system according to claim 1, wherein the model update component derives a classification function that equalizes the first recognition result by the first learning model and the second recognition result by the second learning model to a determination result value for the second recognition result for all the elements of the second learning data set.

5. The learning-based data processing system according to claim 4, wherein the model update component generates the cascaded learning model based on a BKS (Behavior Knowledge Space) method.

6. The learning-based data processing system according to claim 5, wherein the model update component constructs a set of BKS elements each including key data and a statistics vector for the key data.

7. The learning-based data processing system according to claim 6, wherein the key data comprise the first recognition result and the second recognition result.

8. The learning-based data processing system according to claim 6, wherein the statistics vector is configured as [the number of times that the key data appears in the second learning data set, the number of times that the determination result value is c when the key data appear for all elements c of the classification function].

9. The learning-based data processing system according to claim 8, wherein the model update component constructs the classification function by mapping an element to the key data, the element having the maximum value among the elements of the statistics vector from the second element to the last element.

10. A model update method of a learning-based data processing system which generates a learning model by learning a learning data set, recognizes observational data according to the learning model, and provides a recognition result, the model update method comprising the steps of:
generating a first learning model based on a first learning data set;
generating a second learning model based on a second learning data set; and
generating a cascaded learning model by cascading the first learning model and the second learning model,
the model update method further comprising the steps of:
outputting a recognition result by applying the learning model to the observational data; and
evaluating the recognition result, and outputting a determination result value,
wherein the step of generating the cascaded learning model comprises the step of generating the cascaded learning model based on a first recognition result by the first learning model and a second recognition result by the second learning model.

11. The model update method according to claim 10, wherein each of the step of generating the first learning model and the step of generating the second learning model comprises the step of learning the corresponding learning data set based on an artificial neural network.

12. The model update method according to claim 10, wherein the step of generating the cascaded learning model further comprises the step of constructing the second learning data set when the number of observational data is equal to or more than a preset reference value.

13. The model update method according to claim 10, wherein the step of generating the cascaded learning model comprises the step of deriving a classification function that equalizes the first recognition result by the first learning model and the second recognition result by the second learning model to a determination result value for the second recognition result for all elements of the second learning data set.

14. The model update method according to claim 13, wherein the step of generating the cascaded learning model comprises the step of generating the cascaded learning model based on a BKS method.

15. The model update method according to claim 14, wherein the step of generating the cascaded learning model further comprises the step of constructing a set of BKS elements each including key data and a statistics vector for the key data.

16. The model update method according to claim 15, wherein the key data comprise the first recognition result and the second recognition result.

17. The model update method according to claim 15, wherein the statistics vector is configured as [the number of times that the key data appears in the second learning data set, the number of times that the determination result value is c when the key data appear for all elements c of the classification function].

18. The model update method according to claim 17, wherein the step of generating the cascaded learning model further comprises the step of constructing the classification function by mapping an element to the key data, the element having the maximum value among the elements of the statistics vector from the second element to the last element.

* * * * *